United States Patent
Martin, Jr.

(10) Patent No.: US 6,873,989 B1
(45) Date of Patent: Mar. 29, 2005

(54) GRAPHICAL DISPLAY OF IMS SPACE USAGE CHARACTERISTICS

(75) Inventor: James L. Martin, Jr., Round Rock, TX (US)

(73) Assignee: BMC Software, Inc., Houston, TX (US)

(*) Notice: Subject to any disclaimer, the term of this patent is extended or adjusted under 35 U.S.C. 154(b) by 950 days.

(21) Appl. No.: 09/680,059

(22) Filed: Oct. 4, 2000

(51) Int. Cl.[7] .............................................. G06F 17/30
(52) U.S. Cl. ........................ 707/101; 707/200; 707/100
(58) Field of Search ............................... 707/101, 9, 1, 707/100, 200; 345/764, 771, 772, 835

(56) References Cited

U.S. PATENT DOCUMENTS

| | | | | |
|---|---|---|---|---|
| 5,737,591 A | * | 4/1998 | Kaplan et al. | 707/1 |
| 5,761,667 A | * | 6/1998 | Koeppen | 707/101 |
| 5,960,200 A | * | 9/1999 | Eager et al. | 717/147 |
| 6,278,999 B1 | * | 8/2001 | Knapp | 707/9 |
| 6,337,699 B1 | * | 1/2002 | Nielsen | 345/837 |
| 6,418,443 B1 | * | 7/2002 | Martin, Jr. | 707/101 |

OTHER PUBLICATIONS

IBM Database Analysis Tools from IBM, © IBM Corporation, 2000, 2 pages.
Pointer Checker Plus Data Sheet; © BMC Software, Inc., Feb. 1997, 2 pages.

* cited by examiner

Primary Examiner—Jean M. Corrielus
(74) Attorney, Agent, or Firm—Wong, Cabello, Lutsch, Rutherford & Brucculeri, L.L.P.

(57) ABSTRACT

A method and system for graphically displaying space management data of IMS databases. In one embodiment, the method involves receiving a plurality of records from an IMS database. The plurality of records may comprise ranges of free space within the IMS database, and may be processed to generate database information. The database information may comprise information concerning the condition of blocks in the IMS database and space usage information. Calculations of view ratios may be made. A working storage array may be built to consolidate the plurality of records. A plurality of view envelopes may be constructed. The size for each view envelope may be measured in blocks or in bytes. The plurality of view envelopes may be graphically displayed on a display. A legend may also be displayed on the display. User input may be received to request "inspection" or "identification" of a selected view envelope.

38 Claims, 12 Drawing Sheets

GRAPHICAL DISPLAY OF IMS SPACE USAGE CHARACTERISTICS

BACKGROUND OF THE INVENTION

1. Field of the Invention

The present invention relates to computer software, and more particularly to displaying space management data of IMS databases.

2. Description of the Related Art

The IMS database (IMS DB) was created in 1970 by International Business Machines Corporation (IBM) and is one of the two major parts to IBM's IMS/ESA (Information Management System/Enterprise Systems Architecture). The second part is a data communications system (IMS Transaction Manager or IMS TM). Together, the transaction manager and the database manager create a complete online transaction processing environment providing continuous availability and data integrity. IMS/ESA runs under the MVS/ESA or OS/390 operating systems, which run on the S/390 platform.

At the heart of IMS DB are its databases and its data manipulation language, Data Language/I (DL/I). The IMS database is a hierarchical (non-relational) database. IMS databases are hierarchic collections of data, information organized in a pyramid fashion with data at each level of the hierarchy related to, and in some way dependent upon, data at the higher level of the hierarchy. DL/I calls allows a user to create and access these IMS databases.

An IMS database may include one or more data set groups. Each data set group may include one or more segments. A segment is the smallest piece of data DL/I can store. Each segment may be qualified by its hierarchical relationship to other segments in a database record. Each database record has one root segment and zero or more child segments. A "root segment" is at the top of the hierarchy, and there may be only one root segment in a database record. All other segments (other than the one root segment) in a database record are referred to as "dependent segments", and their existence depends on there being a root segment. A "parent segment" is any segment that is defined in the database descriptor (DBD) as capable of having a dependent segment beneath it in the hierarchy. A "child segment" is any segment that is a dependent of another segment above it in the hierarchy.

Segments may be of various segment types. Those segments which share similar qualities are of the same type. For example, if the root segment of a database record represents a course, and that root segment has three child segments labeled: instructor, student, and location, those child segments may be referred to as segment types.

The root segment is referred to as a first level of the IMS database, and direct children of the root segment are referred to as a second level of the IMS database. As used herein, a second level of the IMS database may alternatively be referred to as a first level child segment, as child segments may only appear starting with the second level of the IMS database. Similarly, children of the children of the root segment (i.e., grandchildren of the root segment) are referred to as a third level of the IMS database, or alternatively, second level child segments. The level of each subsequent generation of children may be determined by incremented the previous level by one (e.g., a fourth level of the IMS database is equivalent to a third level child segment).

An IMS database includes a maximum of ten data set groups into which segments of an IMS database may be written. Each segment type may only be assigned to one data set group. When IMS databases are created, definitions of which data set group each segment type is to be written to are specified. In some cases, an IMS database may also be divided into partitions, in addition to being distributed across data set groups. A database record is made up of a root segment and child segments. As an IMS database is used, segments and database records are added, modified and deleted. Over time, the child segments of a database record may become scattered across different blocks within a data set group, resulting in slower access times and longer latencies than would occur if the child segments were closer together or contiguous. Reorganizing the location of the various segments of an IMS database such that segments of database records are closer together results in faster access times and shorter latencies.

The need to periodically reorganize an IMS database stems from the dynamic nature of insertions and deletions of segments in an IMS database. In general, as new child segments are added to an IMS database hierarchy, the segments may be added to blocks depending on space availability. As a result, related segments (i.e., segments belonging to the same database record) may be stored in different blocks, possibly non-contiguous blocks. Due to this scattering of related segments across different blocks within a data set group, over time, the IMS database becomes fragmented. Fragmentation exists in both segment to segment access and distribution of free space within the blocks. As a result, access of a database record may require reading a number of non-contiguous blocks, which results in lengthier access times. One method of reducing access times is to reorganize the IMS database in order to more closely position segments belonging to the same database record and to re-distribute areas of free space for later insertions.

The current technique of timing reorganizations of IMS databases (i.e., deciding when to initiate a reorganization) is typically based on either a temporal trigger (e.g., daily, weekly, monthly, quarterly), a volume trigger (e.g., after 1,000 transactions), or a shortage of free space available to hold new database data. Failure to detect or anticipate a shortage of free space may cause the database and supporting applications to suffer an 'outage' and therefore be unable to perform important business tasks. Failure of the applications to perform the business tasks may result in significant lost revenue and business opportunities. It is desirable to have a method of analyzing space usage characteristics that may be able to recognize that the amount and distribution of free space available in an IMS database (or even a selected block or data set group subset of an IMS database) is approaching a threshold. Reaching this threshold would indicate either a benefit from reorganizing the IMS database or the potential for a database 'outage' due to lack of free space. A visual or graphical representation of the free space available may allow an 'outage' to be avoided. A visual or graphical representation of the space usage characteristics of an IMS database may also be helpful for a DBA (database administrator) or other knowledgeable user in adjusting database parameters that control how free space within the database is managed. It is desirable for a DBA or other knowledgeable user to have access to the graphical representation of the space usage characteristics of the IMS database remotely (i.e., without requiring the user to manually connect/login to the IMS database), for purposes of analysis. For at least the foregoing reasons, there is a need for an improved system and method for displaying the space usage characteristics of databases, such as IMS databases.

SUMMARY OF THE INVENTION

The present invention provides various embodiments of an improved method and system for displaying space management data of IMS databases.

In one embodiment, the method involves receiving a plurality of records from an IMS database. The plurality of records may comprise ranges of free space within the IMS database. The plurality of records may be transmitted to a client computer system, such as a Microsoft Windows based computer system, for display in a graphical user interface. The transmission may be accomplished through various conventional means (e.g., ftp (File Transfer Protocol) or TCP/IP (Transmission Control Protocol/Internet Protocol)). The transmission may be initiated from either the mainframe computer system or from the client computer system.

The plurality of records may be processed to generate database information. The database information may comprise information concerning the condition of blocks in the IMS database and space usage information. Calculations of view ratios may be made, based upon the database information. A working storage array may be built to consolidate the plurality of records. A plurality of view envelopes may be constructed, based upon data in the working storage array. The size of the plurality of view envelopes constructed may be based upon a first view ratio. In one embodiment, the size for each view envelope may be measured in blocks. In an alternate embodiment, the size for each view envelope may be measured in bytes.

The plurality of view envelopes may be graphically displayed on a display. A legend may also be displayed on the display, for purposes of explaining the various markings and/or colors within each view envelope. Relative byte addresses (RBAs) may be displayed, to indicate the RBAs corresponding to the view envelopes displayed.

User input may be received. The user input may specify a sub-set of the plurality of view envelopes to be graphically displayed. The user input may be to request "inspection" of a selected view envelope. Inspecting a view envelope is a way to see more detailed information about the space usage associated with the blocks or bytes represented by a single view envelope. The user input may be to request "identification" of a selected view envelope. Identifying a view envelope is a way to display identifying information about the view envelope (e.g., RBA, percentage of database space represented by the view envelope that is used, and any of the identifying terms: "Bit map/Vsam", "Bad blk/Fse err", "Overflow", and "Most desired"), if their conditions are present.

BRIEF DESCRIPTION OF THE DRAWINGS

A better understanding of the present invention can be obtained when the following detailed description of various embodiments is considered in conjunction with the following drawings, in which.

Figure 1:
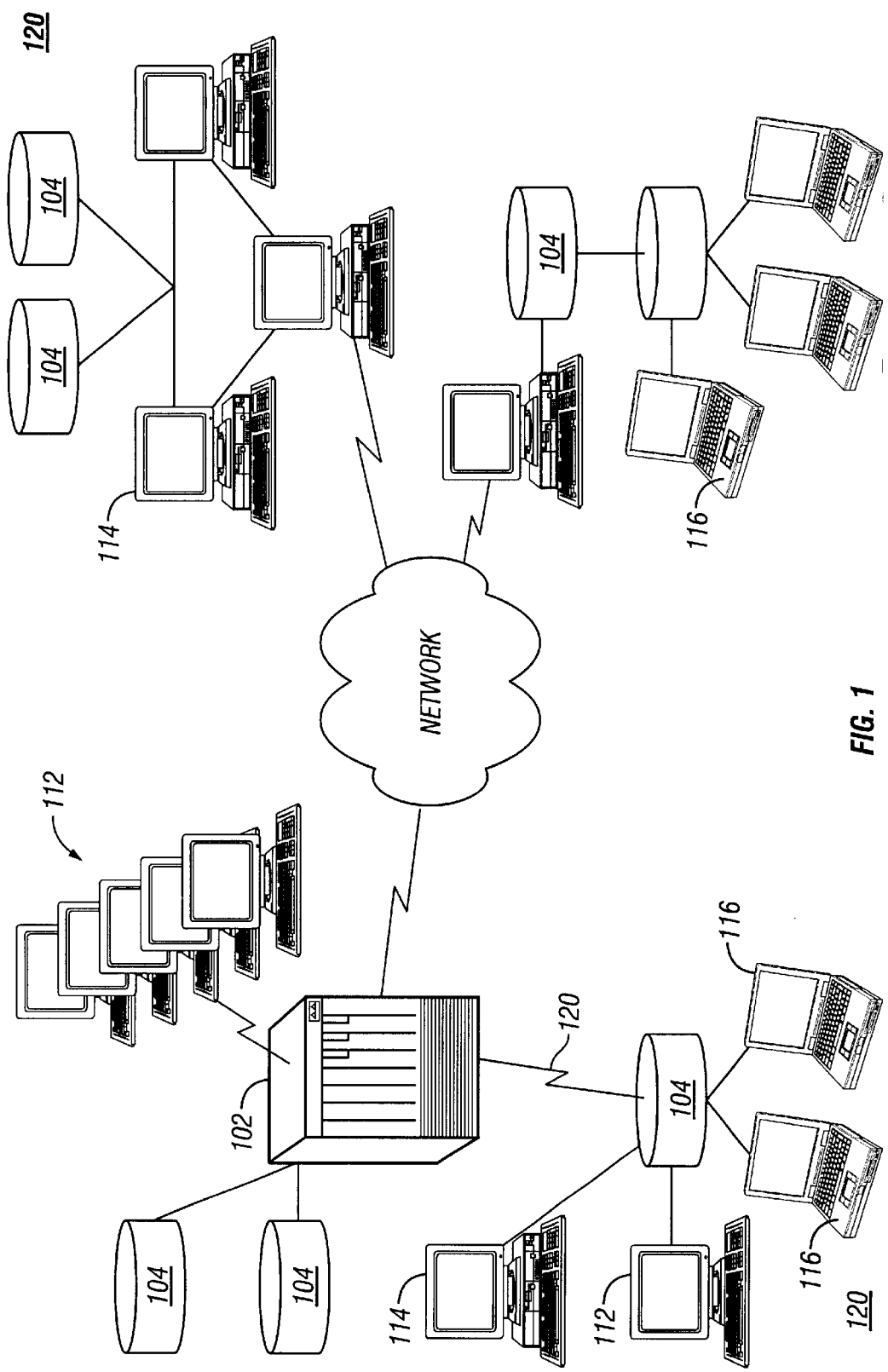
FIG. 1 illustrates an exemplary enterprise computing environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

U.S. Pat. No. 6,606,631 entitled "IMS On-Line Reorganization Utility" and issued on Aug. 12, 2003 is hereby incorporated by reference as through fully and completely set forth herein.

FIG. 1: An Enterprise Computing Environment

FIG. 1 illustrates an exemplary enterprise computing environment according to one embodiment of the present invention. As shown, the enterprise computing environment may include one or more computers 102, shown as mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 1, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 1, the mainframe computer 102 may also be coupled through a wide area network, represented by the "cloud" in FIG. 1, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art, as well as a display device. In a similar manner, each of the desktop computer systems 114 and/or portable computer systems 116, or other computer systems comprised in the enterprise, comprise various standard computer components including one or more CPUs, one or more buses, memory, a power supply, non-volatile memory, and a display, such as a video monitor or LCD display. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. In the present application, the term "database" includes both databases and data sets, such as an IMS data set, among others. In one embodiment, the database stored in the mainframe computer system 102 is desired to be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102. In the preferred embodiment, the database stored on the mainframe computer system is the IMS database. However, the present invention may be used with other types of databases.

One embodiment of the present invention preferably comprises software programs designed to graphically display database space usage characteristics, said software programs stored in the mainframe computer system 102 and/or one or more of the computer systems 114, 116 or 104 which operate to provide various services. Where the database used is the IMS database, the database space usage characteristics software programs comprise IMS database space usage characteristics software programs. The IMS database space usage characteristics software programs are preferably comprised on the one or more of the computer systems 114, 116. However, it is noted that portions of the IMS database space usage characteristics software programs may be distributed throughout one or more computers in the enterprise, including the mainframe computer system 102. Also, the IMS database space usage characteristics software programs preferably interface to one or more various OEM utilities.

One or more of the computer systems 102, 112, 114, and 116 preferably include a memory medium on which computer programs according to the invention may be stored. The term "memory medium" is intended to include an installation medium, e.g., a CD-ROM, or floppy disks, a computer system memory or random access memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for graphically displaying database space usage characteristics as described herein. The software program(s) may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A computer system executing code and data from the memory medium comprises a means for graphically displaying space usage characteristics according to the methods and/or block diagrams described below.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks 102 and/or 104 and/or a wireless link.

In the preferred embodiment, the present invention comprises one or more software components, preferably a plurality of software components, which operate to provide various graphical displays of space usage characteristics of databases, such as IMS databases.

According to one embodiment of the present invention, a DBA (Data Base Administrator) or other knowledgeable user may adjust database parameters that control how free space within the database is managed, in response to the graphical display of the database space usage characteristics. Further, the DBA or other knowledgeable user may analyze the graphical representation of the space usage characteristics of the IMS database remotely (i.e., without requiring the user to manually connect/login to the IMS database).

Figure 2:
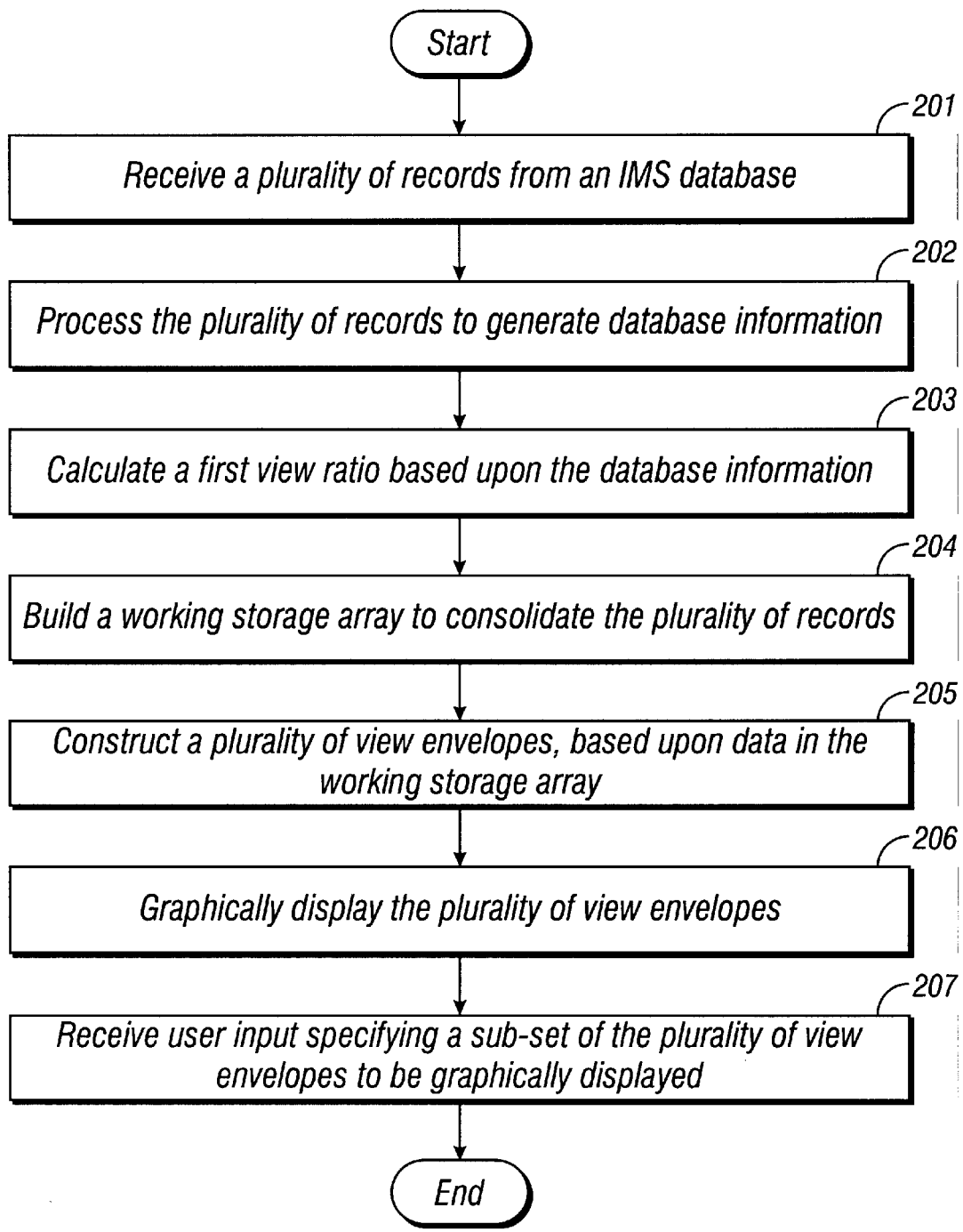
FIG. 2 is a flowchart illustrating an overview of graphically displaying space usage characteristics of an IMS database according to one embodiment.

FIG. 2: Graphical Display of Space Usage Characteristics of an IMS Database

FIG. 2 is a flowchart illustrating an embodiment of a system and method for graphically displaying space usage characteristics of an IMS database.

In step 201, a plurality of records from an IMS database may be received. The plurality of records may comprise ranges of free space within the IMS database. In one embodiment, an IMS database extraction utility may be used to create the plurality of records.

In step 202, the plurality of records may be processed to generate database information. The database information may comprise information concerning the condition of blocks in the IMS database and space usage information (e.g., percentage of space used on a byte, block or multiple block basis, and/or the condition of a byte or block). In step 203, a first view ratio may be calculated based upon the database information generated in step 202.

In step 204, a working storage array may be built, wherein the working storage array consolidates the plurality of records. As used herein, a working storage array may be used as a place to hold the database information received from the IMS database such that as various presentations or slices of the data are requested by a user, multiple retrievals of similar information regarding the state of the IMS database are not necessary. Thus, the working storage array may be referenced for the particular sub-set of information requested, based on user input, rather than requiring access to the IMS database to retrieve the particular sub-set of information requested.

In step 205, a plurality of view envelopes may be constructed, based upon data in the working storage array. The size of the plurality of view envelopes constructed may be based upon the first view ratio. In one embodiment, the size for each view envelope may be measured in blocks. In an alternate embodiment, the size for each view envelope may be measured in bytes.

In step 206, space usage characteristics may be graphically displayed on a display. The space usage characteristics may be determined from at least a sub-set of the plurality of view envelopes. A legend, as described below, may also be displayed on the display, for purposes of explaining the various markings and/or colors within each view envelope. Relative byte addresses (RBAs) may be displayed, to indicate the RBAs corresponding to the view envelopes displayed.

In step 207, user input may be received. The user input may specify a sub-set of the plurality of view envelopes to be graphically displayed. In one embodiment, which may be referred to as "inspection", one of the plurality of view envelopes may be selected, a second view ratio may be calculated based upon the first view ratio, a sub-set of the plurality of view envelopes may be constructed based upon the selected view envelope, and the sub-set of the plurality of view envelopes may be graphically displayed on the display, including more detailed information for the sub-set of the plurality of view envelopes than is shown for the plurality of view envelopes. In one embodiment, the number of view envelopes graphically displayed may be equal to the first view ratio. In another embodiment, the first view ratio may be measured in blocks, and the second view ratio may be measured in bytes.

In an alternate embodiment, which may be referred to as "identification", one of the plurality of view envelopes may be selected, detailed information for the selected view envelope may be graphically displayed on the display, including more detailed information for the selected view envelope than is shown for the plurality of view envelopes. The detailed information for the selected view envelope may include one or more of the following items related to the blocks or bytes represented by the selected view envelope: a relative byte address, a percentage of used database space, identification of a condition of the blocks or bytes represented by the selected view envelope (e.g., a special bit map block, a special VSAM block, a bad block, a most desired block, a block in error, a Free Space Element error, an overflow error), details concerning a reason for any error condition that exists, options for repairing any error condition that exists such that the blocks in error within the selected view envelope are made available as free space.

Figure 3:
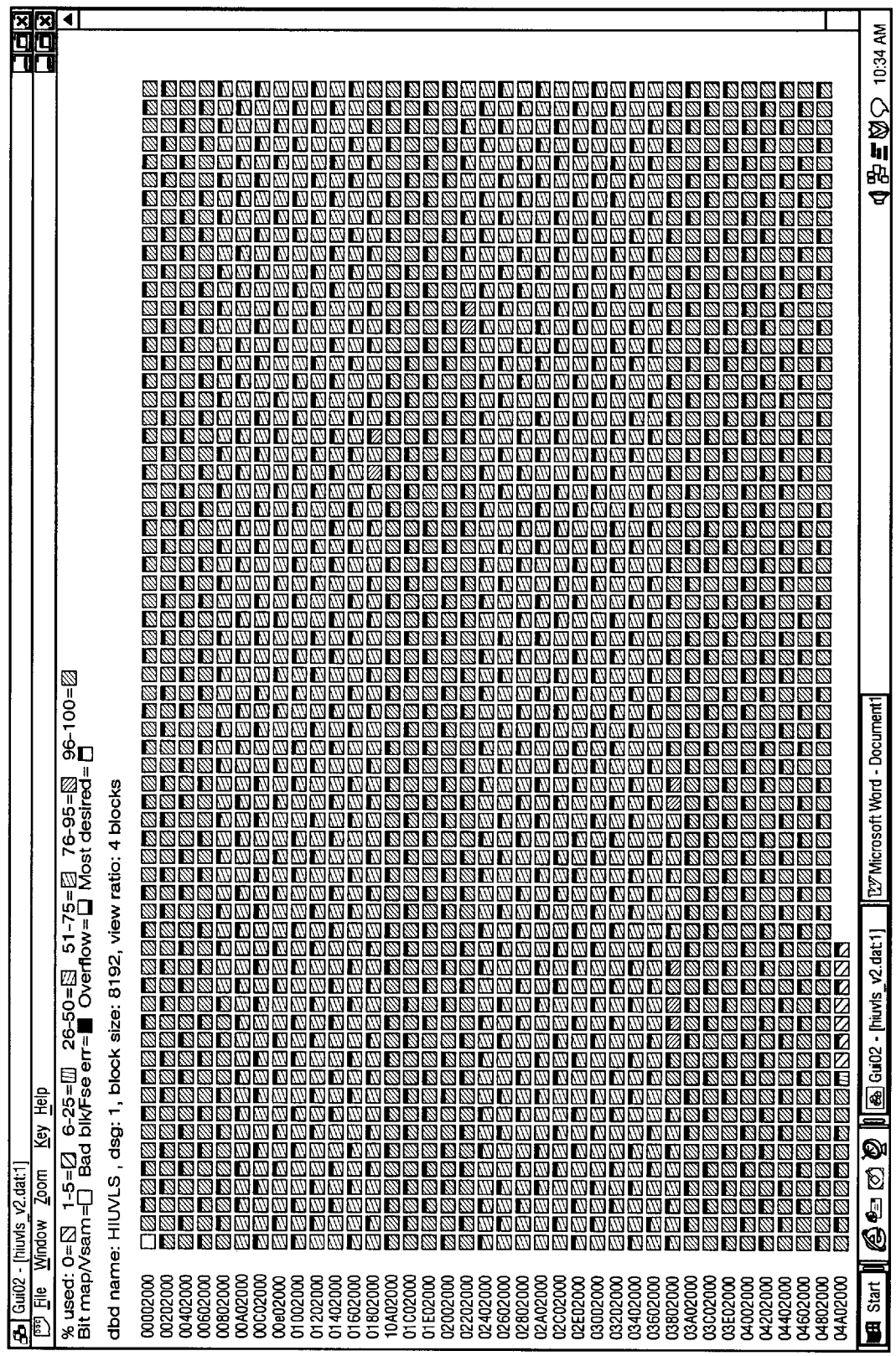
FIG. 3 is a screen shot of an initial view of data set group 1, of IMS database HIUVLS, with a view ratio of 4 blocks, displaying space usage characteristics of the IMS database according to one embodiment.

FIG. 3: Initial View Data Set Group 1, IMS Database HIUVLS, View Ratio 4 Blocks

FIG. 3 is a screen shot of an embodiment of an initial view of data set group 1, of IMS database HIUVLS, with a view ratio of 4 blocks, displaying space usage characteristics of the IMS database. The information or records that form the source of the space usage characteristics displayed in the screen shot may be extracted from the HIUVLS IMS database on a mainframe computer system. Subsequent to the extraction on the mainframe, the data may be transmitted to a client computer system, such as a Microsoft Windows based computer system, for display in a graphical user interface. The transmission may be accomplished through various conventional means (e.g., ftp (File Transfer Protocol) or TCP/IP (Transmission Control Protocol/Internet Protocol)). The transmission may be initiated from either the mainframe computer system or from the client computer system.

As used herein, a "control interval (CI)" denotes the smallest data container for a VSAM (Virtual Sequential Access Method) data set. It is noted that VSAM is a product of IBM Corporation. The terms "block" and "control interval" are synonyms; therefore, any reference to "block" may be interchanged with "control interval" herein.

As shown in FIG. 3, the three lines at the top of the screen comprise a legend for a view envelope area or view envelope mapping. The legend may include an explanatory list of the meaning of the various markings and/or colors of the view envelopes in the view envelope area, along with a description of the contents of the view envelope area. As used herein, a "view envelope" comprises information displayed on the display (i.e., on the graphical user interface or GUI of the display) that graphically represents space usage characteristics within a database, such as an IMS database. The view envelope may utilize different colors and/or markings to indicate different types of information, such as the percentage of space used or the condition of a byte or block. As used herein, space usage characteristics may include percentage of space used on a byte, block or multiple block basis, and the condition of a byte or block (e.g., a special bit map block, a special VSAM block, a bad block, a most desired block, an error block, a Free Space Element error block, an overflow error block). In one embodiment, various colors may be used to represent various ranges of percentage of used space (e.g., 0% used=dark green, 1–5% used=light green, 6–25% used=blue, 26–50% used=light blue, 51–75% used=pink, 76–95% used=yellow, 96–100% used=red). In an alternate embodiment, grayscale or various shades of black-and-white may be used in place of color to distinguish between the various ranges of percentage of used space. Yet another embodiment may include various symbols or markings (e.g., \\\, ///, XXX, ~~~, <<<<<, >>>>, ****) that may easily be distinguished when printed in black-and-white.

The view envelope area preferably appears below the legend. The view envelope area may include one or more view envelopes. An individual view envelope represents an area within a particular data set group within an IMS database. The area may be measured in blocks or bytes. The RBA (Relative Byte Address) of the first block or byte represented by the first view envelope in a view envelope area may appear to the left of that view envelope. The first view envelope may also represent additional blocks or bytes, however, only the first block or byte represented by the first view envelope may appear to the left of that view envelope as a reference point to the beginning block or byte range represented by that view envelope. The second and subsequent view envelopes in a row in a view envelope area typically do not have their corresponding first block or byte RBAs explicitly noted in the view envelope area. When the number of view envelopes in a view envelope area exceeds the number of view envelopes that will fit on one row, the first view envelope on the second row of the view envelope area is typically preceded by the RBA of its corresponding first block or byte. Subsequent rows of view envelopes may follow the same pattern (i.e., the first view envelope of a row preceded by the RBA of its corresponding first block or byte, the subsequent view envelopes in a row following the first view envelope of the row, without their corresponding first block or byte RBAs explicitly identified).

The first line of the legend, as shown in FIG. 3, indicates that the color of the view envelope refers to the percentage of space that is used (i.e., space that is not available for newly inserted segments) in the view envelope. Although seven ranges of "% used" are shown (i.e., 0, 1–5, 6–25, 26–50, 51–75, 76–95, 96–100), in alternate embodiments the number of ranges of "% used" may be increased or decreased, as well as the actual breakpoints (i.e., at what percentage each range begins and ends) of the ranges may be different. In one embodiment, the user may specify the number of ranges and the breakpoints of the ranges.

The second line of the legend, as shown in FIG. 3, includes the following descriptors: "Bit map/Vsam", "Bad blk/Fse err", "Overflow", and "Most desired". The "Bit map/Vsam" descriptor shows that a white (i.e., not colored) view envelope indicates that a reserved block is represented by the view envelope. A reserved block may be reserved for bit map data (e.g., a map of free blocks, as described more fully in U.S. application Ser. No. 09/615,569) or for IMS or VSAM control data. Typically, the first block of a data set group is a reserved block.

The "Bad blk/Fse err" descriptor shows that a black view envelope indicates that a "bad" block is represented by the view envelope. A bad block may be "bad" for one or more of a multiple of reasons. Regardless of the reason or cause of the block being labeled "bad", a bad block is not available for newly inserted segments. The "Bad blk/Fse err" descriptor is an abbreviation for the terms "Bad block/Free Space Element (Fse) error". As used herein, a "free space element" is an 8 byte IMS control block that is imbedded within an IMS block. The "free space element" describes ranges of free space that are at least 8 bytes long.

The "Overflow" descriptor shows that a black bar on the bottom side of a view envelope indicates that an "overflow" block is represented by the view envelope. As used herein, an "overflow" block is a block within an HDAM database that is designated as a member of an "overflow" area for that database. As shown in the second line of the legend in FIG. 3, view envelopes that represent blocks that are "overflow" blocks have a black bar on their bottom side.

The "Most desired" descriptor shows that a black bar on the top side of a view envelope indicates that a "most desired" block is represented by the view envelope. As used herein, a "most desired" block is a block that has been designated by the DBA as the most desirable block for IMS to use when searching for free space to hold an inserted segment. As shown in the second line of the legend in FIG. 3, view envelopes that represent blocks that are "most desirable" blocks have a black bar on their top side.

The third line of the legend, as shown in FIG. 3, describes the contents of the view envelope area, including the following: database descriptor (DBD) name: HIUVLS, data set group number (DSG): 1, block size: 8192, view ratio: 4 blocks. Typically a view envelope has two view states: a byte state and a block state. In the byte state, a view envelope describes 8 bytes of data within a single database block. In the block state, a view envelope describes one or more database blocks. As used herein, a "view ratio" is the size (i.e., number of blocks or bytes) of a view envelope. An "initial view ratio" is a "view ratio" that is used for a first screen display (i.e., the "initial view") of a data set group. The initial view ratio is calculated such that the entire data set group may be shown in one standard-size screen. The user may then be able to visually scan the entire data set group's space usage characteristics at a glance. The ability to see a visual representation of the space usage characteristics in one "big picture" view may emphasize or highlight patterns that would not be as readily recognizable otherwise.

One benefit of a graphical display of the space usage characteristics is that a user may be able to recognize important aspects of how space has been managed within the IMS database. Such important aspects may not be as readily apparent to the user if the space usage characteristics are displayed in other than a graphical format (e.g., in a table or a list of values). Examples of important aspects of particular interest to a user may include: percent of used blocks, percent of free blocks, identification of blocks in error, identification of special blocks (e.g., RAP (Root Anchor Point) blocks, or "most desirable" blocks).

Figure 4:
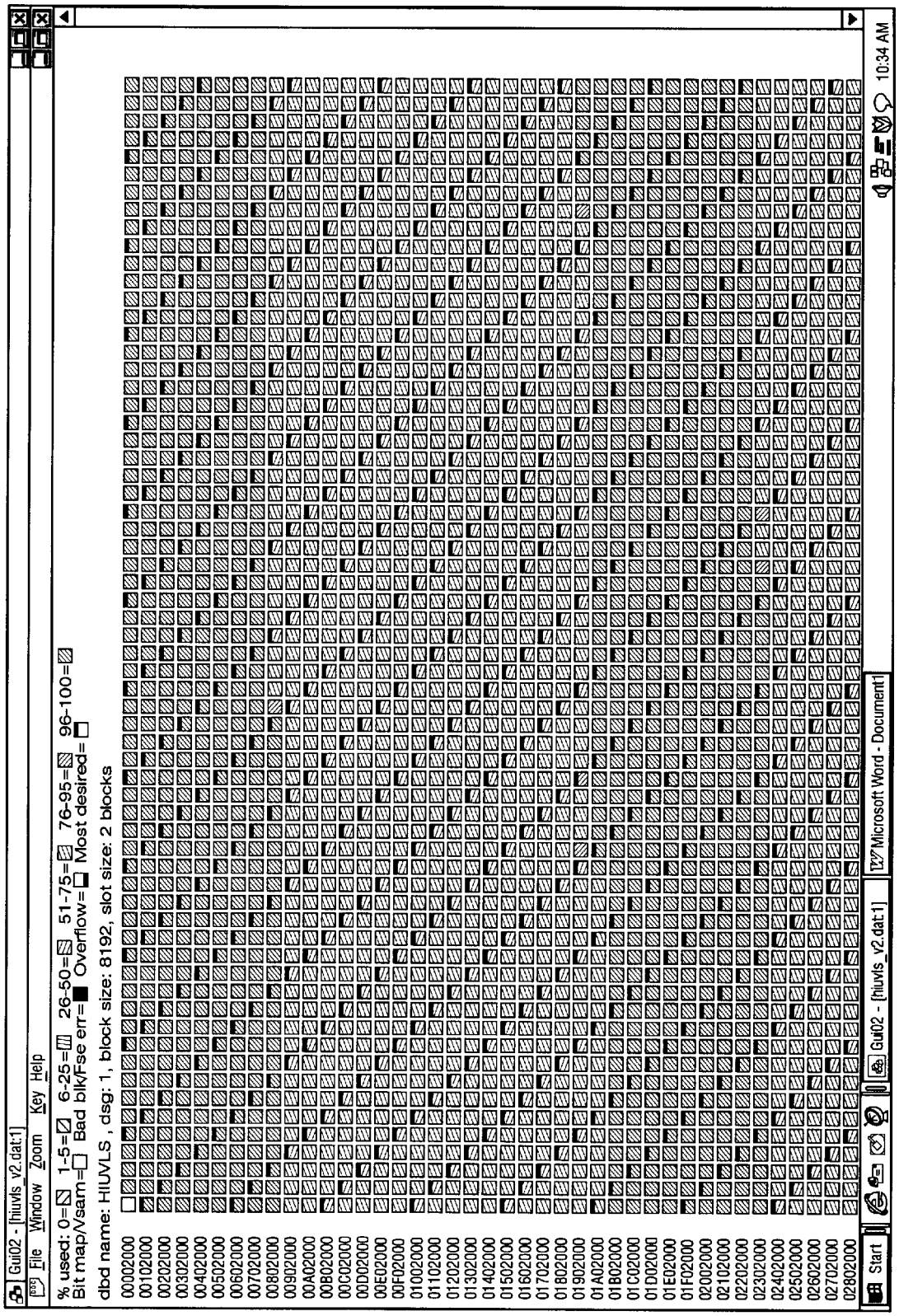
FIG. 4 is a screen shot of a zoom-in of FIG. 3, with a view ratio of 2 blocks, according to one embodiment.

FIG. 4: Zoom-In of FIG. 3, View Ratio 2 Blocks

FIG. 4 is a screen shot of an embodiment of a first zoom-in view of data set group 1, of IMS database HIUVLS, with a view ratio of 2 blocks, displaying space usage characteristics of the IMS database. One method of "Zoom-in" is to choose the Menu Option "Zoom", at which point a pop-up window of sub-menu options will appear (not shown), then choose the sub-menu option "Zoom-in".

Comparing the initial view shown in FIG. 3, with the first zoom-in view shown in FIG. 4, the following differences may be noted: (1) the view ratio in FIG. 3 is 4 blocks, the view ratio in FIG. 4 is 2 blocks; (2) the scroll bar in FIG. 4 indicates that many more view envelopes (i.e., twice as much data as compared to FIG. 3) may be viewed by scrolling down; (3) both Figures begin with the same RBA (00002000), however the RBA 00202000 appears in the second row of FIG. 3 and the third row of FIG. 4, indicating that more view envelopes (i.e., twice as many) are displayed in FIG. 4 than in FIG. 3; (4) each view envelope in FIG. 3 is represented by two view envelopes in FIG. 4. For example, refer to the first three view envelopes of FIG. 3: the first view envelope is white, indicating it includes a "Bit map/Vsam" block, the second view envelope is red, indicating that the blocks that make up the second view envelope are 96–100% used, and the third block view envelope is also red, with the added information that it contains a "most desired" block (this is indicated by the black bar on the top side of the view envelope). These first three view envelopes of FIG. 3 are expanded into the first six view envelopes of FIG. 4, due to the "zoom-in" feature, namely: the first view envelope is white, indicating it includes a "Bit map/Vsam" block, the second, third, and fourth view envelopes are all red, indicating that the blocks that make up the second, third, and fourth view envelopes are 96–100% used, the fifth view envelope is also red, with the added information that it contains a "most desired" block (this is indicated by the black bar on the top side of the view envelope), and the sixth view envelope is red.

Figure 5:
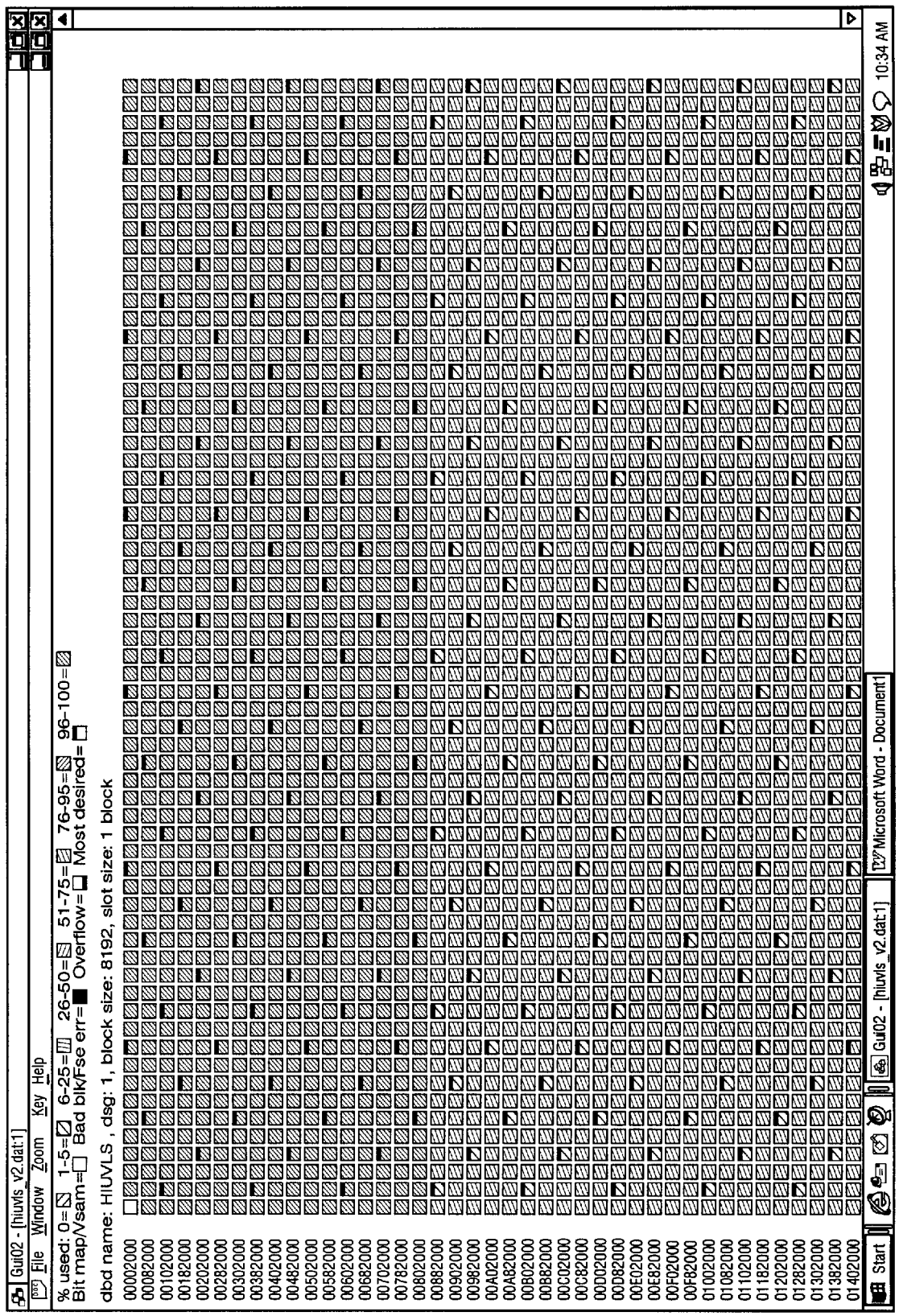
FIG. 5 is a screen shot of a zoom-in of FIG. 4, with a view ratio of 1 block, according to one embodiment.

FIG. 5: Zoom-In of FIG. 4, View Ratio 1 Block

FIG. 5 is a screen shot of an embodiment of a second zoom-in view of data set group 1, of IMS database HIUVLS, with a view ratio of 1 blocks, displaying space usage characteristics of the IMS database. This screen shot may be arrived at by first zooming in from the initial view of FIG. 3 to the view shown in FIG. 4, then subsequently zooming in a second time to arrive at the screen shot shown in FIG. 5.

Comparing the first zoom-in view shown in FIG. 4, with the second zoom-in view shown in FIG. 5, the following differences may be noted: 1) the view ratio in FIG. 4 is 2 blocks, the view ratio in FIG. 5 is 1 block; 2) the scroll bar in FIG. 5 indicates that many more view envelopes (i.e., twice as many as compared to FIG. 4) may be viewed by scrolling down; 3) both Figures begin with the same RBA (00002000), however the RBA 00102000 appears in the second row of FIG. 4 and the third row of FIG. 5, indicating that more view envelopes (i.e., twice as many) are displayed in FIG. 5 than in FIG. 4; 4) each view envelope in FIG. 4 is represented by two view envelopes in FIG. 5. For example, in looking for a view envelope in FIG. 4 that contains a "most desired" block, it may be seen that the fifth view envelope on the first row of view envelopes is the first view envelope containing a "most desired" block (i.e., the first through fourth view envelopes on the first row of view envelopes in FIG. 4 do not contain a "most desired" block) whereas in looking for a view envelope in FIG. 5 that contains a "most desired" block, it may be seen that the tenth view envelope on the first row of view envelopes is the first view envelope containing a "most desired" block (i.e., the first through ninth view envelopes on the first row of view envelopes in FIG. 5 do not contain a "most desired" block). Similar to the "zoom-in" from FIG. 3 to FIG. 4, the "zoom-in" from FIG. 4 to FIG. 5 results in the first five view envelopes of FIG. 4 being expanded into the first ten view envelopes of FIG. 5.

Figure 6:
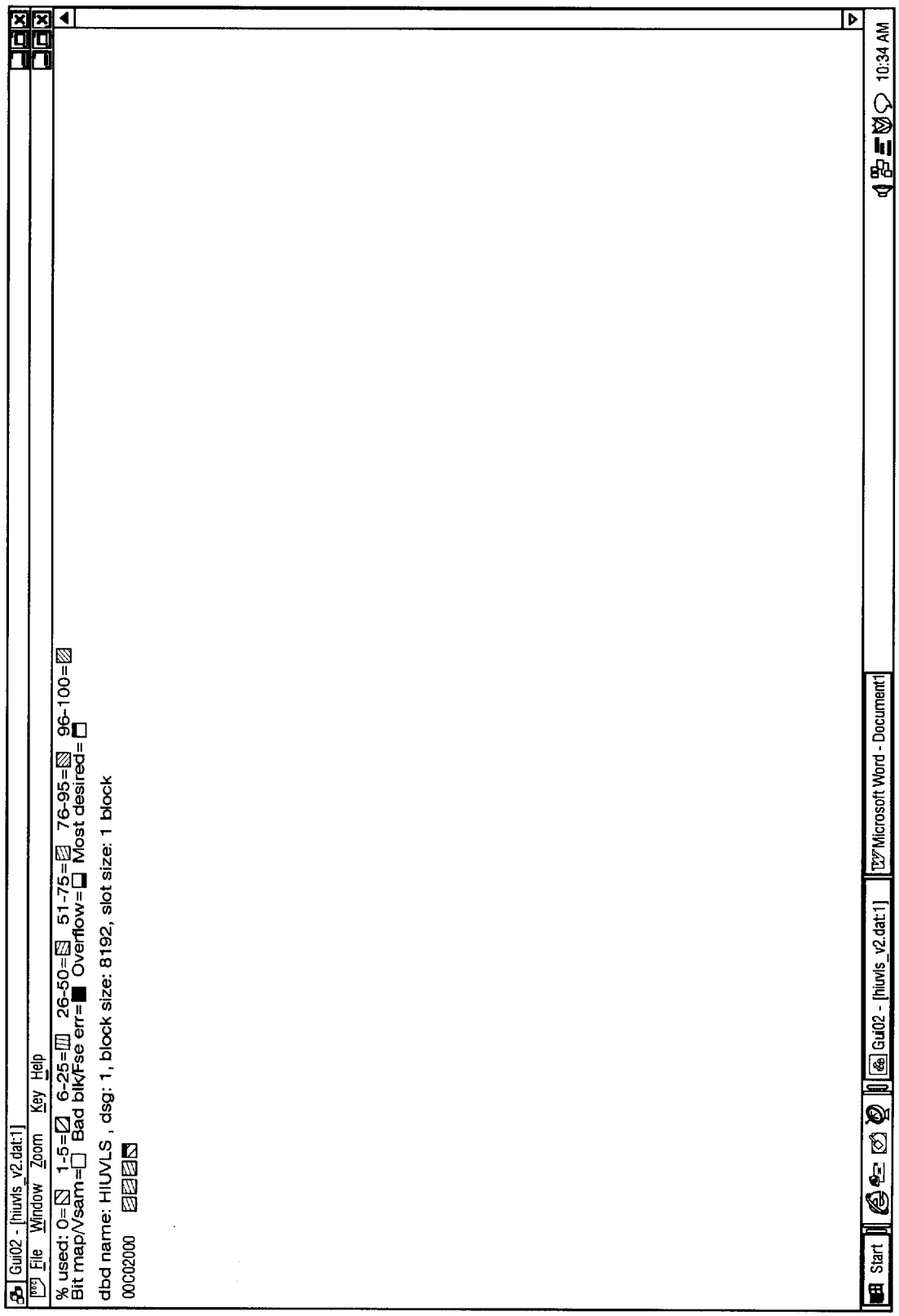
FIG. 6 is a screen shot of an inspection of a view envelope beginning with RBA 00C02000 from FIG. 3, and an identification of a view envelope beginning with RBA 00C08000 according to one embodiment.

FIG. 6: Inspection and Identification from FIG. 3

FIG. 6 is a screen shot of an embodiment of an inspection of a view envelope beginning with RBA 00C02000 from FIG. 3, followed by an identification of a view envelope beginning with RBA 00C08000. Inspecting a view envelope is a way to see more detailed information about the space usage associated with the blocks or bytes represented by a single view envelope. In one embodiment, a left-click of a mouse (or other pointing device) when the mouse is pointing to a single view envelope may indicate an "inspection" user request. Typically, the more detailed information requested is displayed in another window (e.g., a pop-up window). In one embodiment, if the view ratio is something other than 1 block, a number of view envelopes equal to the view ratio when the inspect request was made may be displayed. For example, the view ratio when the inspect request is made is 4 blocks (as shown in FIG. 3), and the resulting pop-up window (FIG. 6) shows four view envelopes and a view ratio of 1 block.

In one embodiment, a right-click of a mouse when the mouse is pointing to a single view envelope may indicate an "identification" user request. Identifying a view envelope is a way to display identifying information about the view envelope (e.g., RBA, percentage of database space represented by the view envelope that is used, and any of the identifying terms: "Bit map/Vsam", "Bad blk/Fse err", "Overflow", and "Most desired"), if their conditions are present. As shown in FIG. 6, the pop-up identification window includes: "Rba: 00C08000; Used: 0%; most desired".

Figure 7:
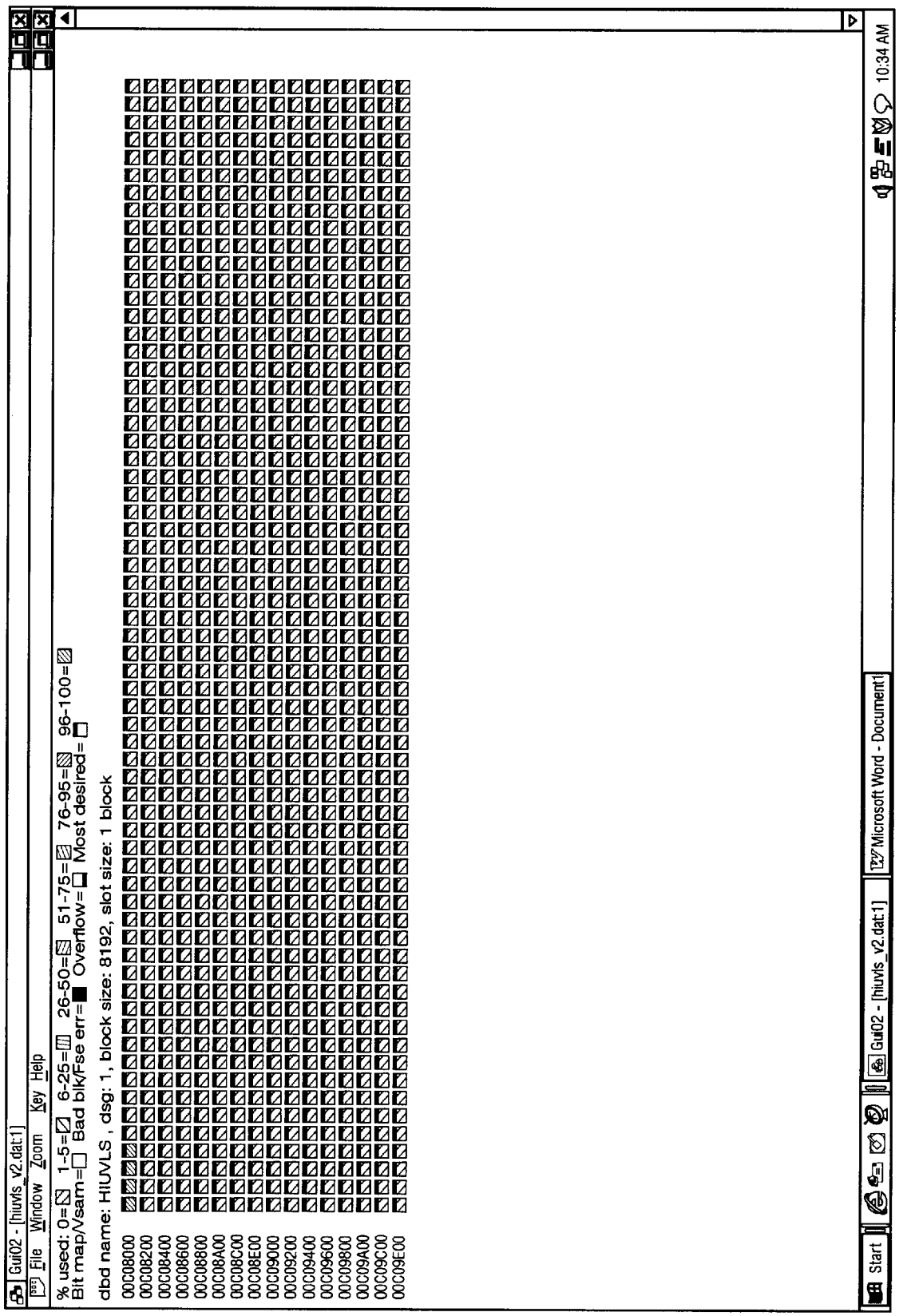
FIG. 7 is a screen shot of an inspection of a view envelope beginning with RBA 00C08000 from FIG. 6 according to one embodiment.

FIG. 7: Inspection from FIG. 6

FIG. 7 is a screen shot of an embodiment of an inspection of a view envelope beginning with RBA 00C08000 from FIG. 6. In FIG. 6, the view ratio is 1 block; since an inspection shows more detail about the space usage associated with the selected view envelope, the view ratio for FIG. 7 is a more detailed increment (i.e., 8 bytes). In one embodiment, if the view ratio is 1 block on the window from which the inspection user request was received (as is the case for FIG. 6), the view ratio on the pop-up window (i.e., FIG. 7) is adjusted to "byte state" (i.e., 8 bytes) and the view envelopes that represent the contents of the block represented by the "inspected" view envelope are displayed. For example, in FIG. 7 the first view envelope shown begins with RBA 00C08000 and each view envelope in FIG. 7 describes 8 bytes worth of space.

Figure 8:
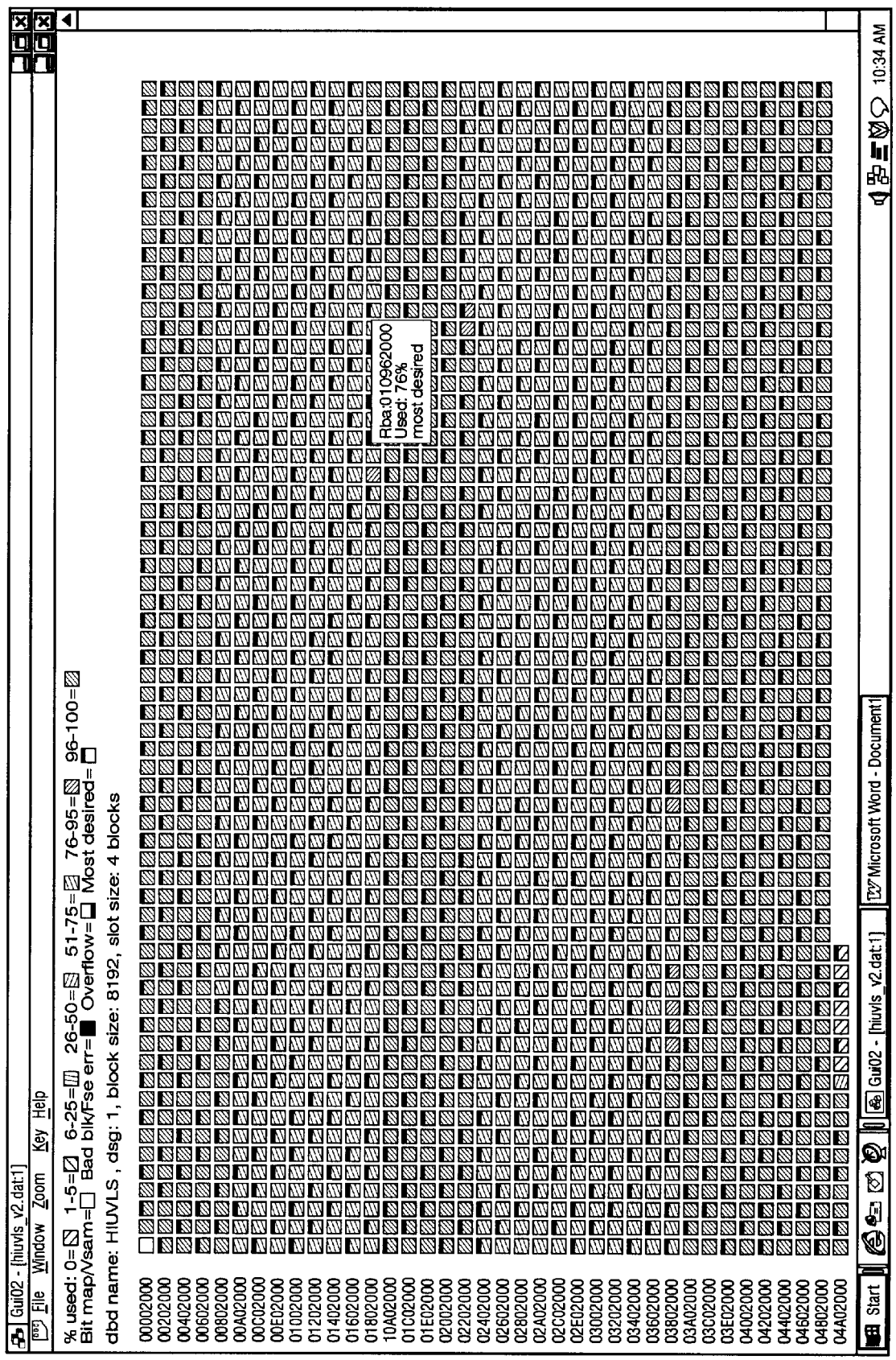
FIG. 8 is a screen shot of the initial view of data set group 1, of IMS database HIUVLS, as in FIG. 3, with a view envelope beginning with RBA 01962000 identified according to one embodiment.

FIG. 8: Initial View from FIG. 3, with an Identification

FIG. 8 is a screen shot of an embodiment of an identification of a view envelope beginning with RBA 01962000 from the initial view of data set group 1, of IMS database HIUVLS, as shown in FIG. 3. In one embodiment, a right-click of a mouse when the mouse is pointing to a single view envelope may indicate an "identification" user request. Identifying a view envelope is a way to display identifying information about the view envelope (e.g., RBA, percentage of database space represented by the view envelope that is used, and any of the identifying terms: "Bit map/Vsam", "Bad blk/Fse err", "Overflow", and "Most desired"), if their conditions are present. As shown in FIG. 8, the pop-up identification window includes: "Rba: 01962000; Used: 76%; most desired".

Figure 9:
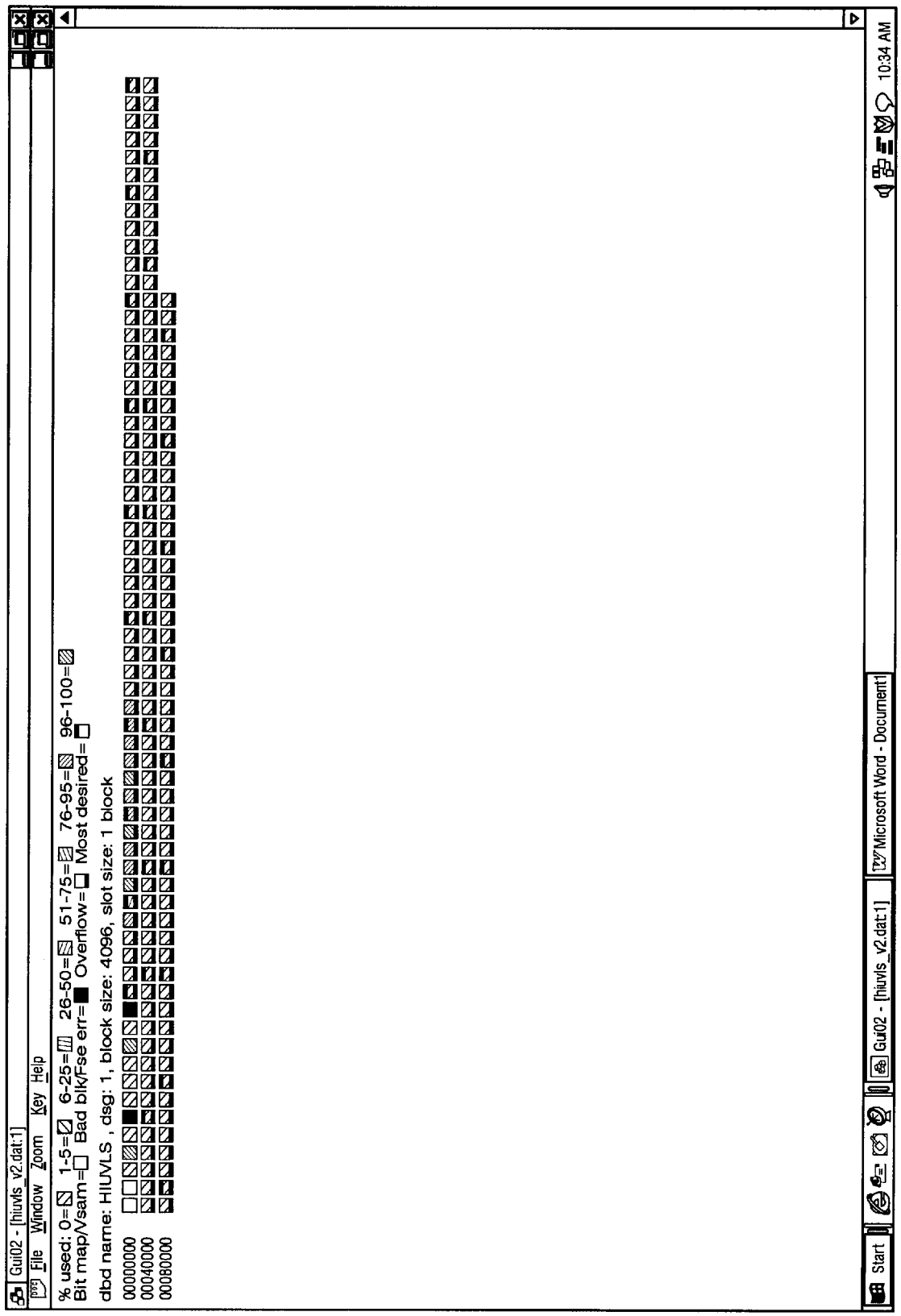
FIG. 9 is a screen shot of an initial view of data set group 1, of IMS database HDPVNJ, displaying space usage characteristics of the IMS database according to one embodiment.

FIG. 9: Initial View Data Set Group 1, IMS Database HDPVNJ

FIG. 9 is a screen shot of an embodiment of an initial view of data set group 1, of IMS database HDPVNJ, with a view ratio of 1 block, displaying space usage characteristics of the IMS database. This screen shot in FIG. 9 is similar to the screen shot in FIG. 3. Three key differences between FIG. 3 and FIG. 9 are the database name, the block size, and the initial view ratio. Additionally, the view envelope areas for FIG. 3 and FIG. 9 are completely different, as the view envelope area represents data from two different databases.

The third line of the legend, as shown in FIG. 9, describes the contents of the view envelope area, including the following: database descriptor (DBD) name: HDPVNJ, data set group number (DSG): 1, block size: 4096, view ratio: 1 block. As noted earlier under FIG. 3, the initial view ratio is calculated such that the entire data set group may be shown in one standard-size screen. Comparing the block size and view ratio values for FIG. 3 and FIG. 9, it may be seen that the data set group in FIG. 3 contains considerably more data than the data set group in FIG. 9, as both the block size (8192 in FIG. 3, 4096 in FIG. 9) and the initial view ratio (4 blocks in FIG. 3, 1 block in FIG. 9) are larger for FIG. 3 than they are for FIG. 9. The block size for an IMS database is a user-defined parameter specified when the IMS database is created. Further, the block size of the IMS database is used in calculating the percentage used value for each view envelope.

Figure 10:
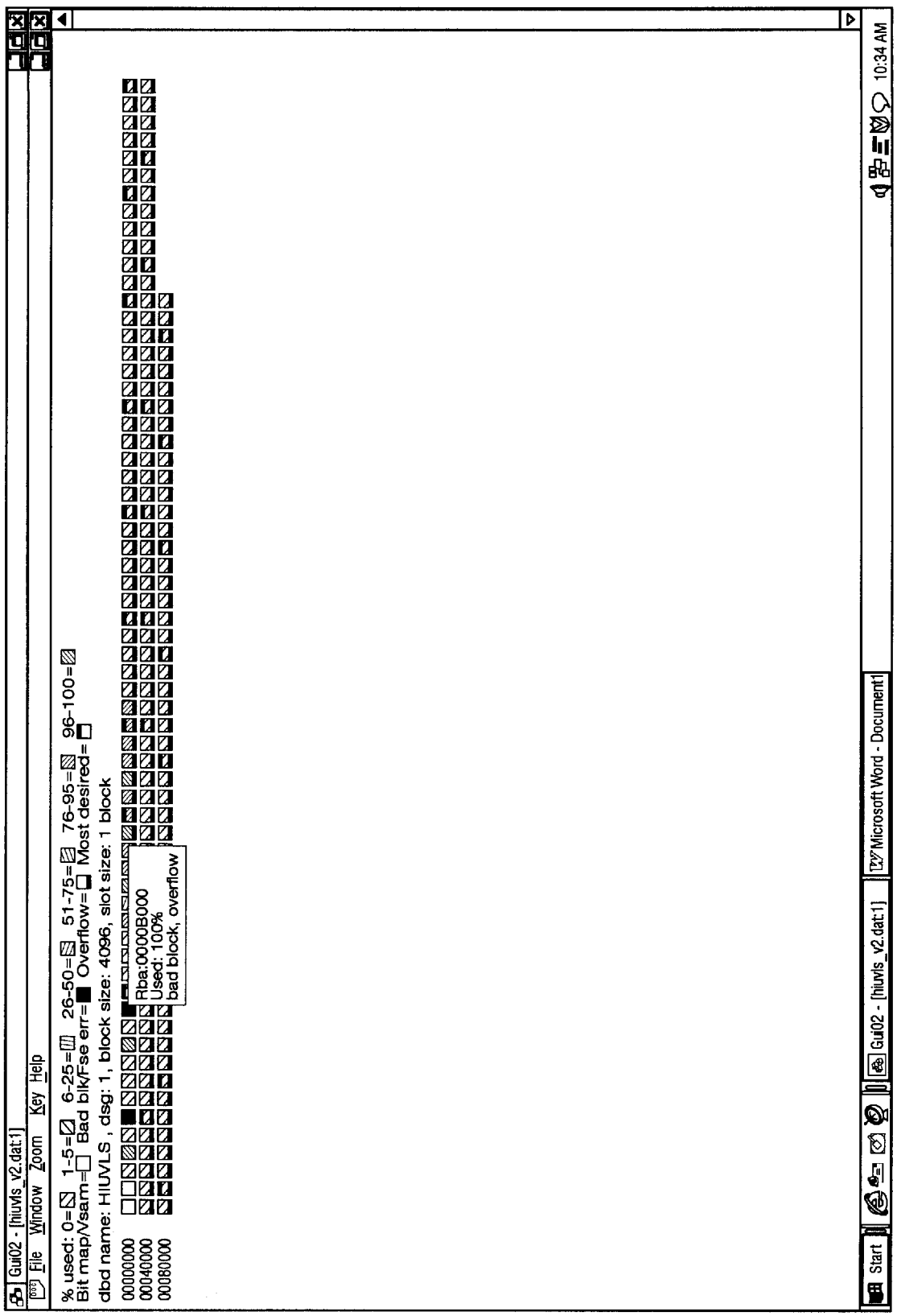
FIG. 10 is a screen shot of the initial view of data set group 1, of IMS database HDPVNJ, as in FIG. 9, with a view envelope beginning with RBA 0000B000 identified according to one embodiment.

FIG. 10: Initial View from FIG. 9, with an Identification

FIG. 10 is a screen shot of an embodiment of an identification of a view envelope beginning with RBA 0000B000 from the initial view of data set group 1, of IMS database HDPVNJ, as shown in FIG. 9. In one embodiment, a right-click of a mouse when the mouse is pointing to a single view envelope may indicate an "identification" user request. Identifying a view envelope is a way to display identifying information about the view envelope (e.g., RBA, percentage of database space represented by the view envelope that is used, and any of the identifying terms: "Bit map/Vsam", "Bad blk/Fse err", "Overflow", and "Most desired"), if their conditions are present. As shown in FIG. 10, the pop-up identification window includes: "Rba: 0000B000; Used: 100%; bad block, overflow".

In one embodiment, selecting a black view envelope (i.e., a view envelope marked as bad for one or more of a multiple of reasons) may result in a display (not shown), perhaps in a pop-up window, of what is wrong with the block(s) in that view envelope. Additionally, options or alternatives for fixing or repairing the block(s) such that the block(s) may become available as free space may be presented to the user.

Figure 11:
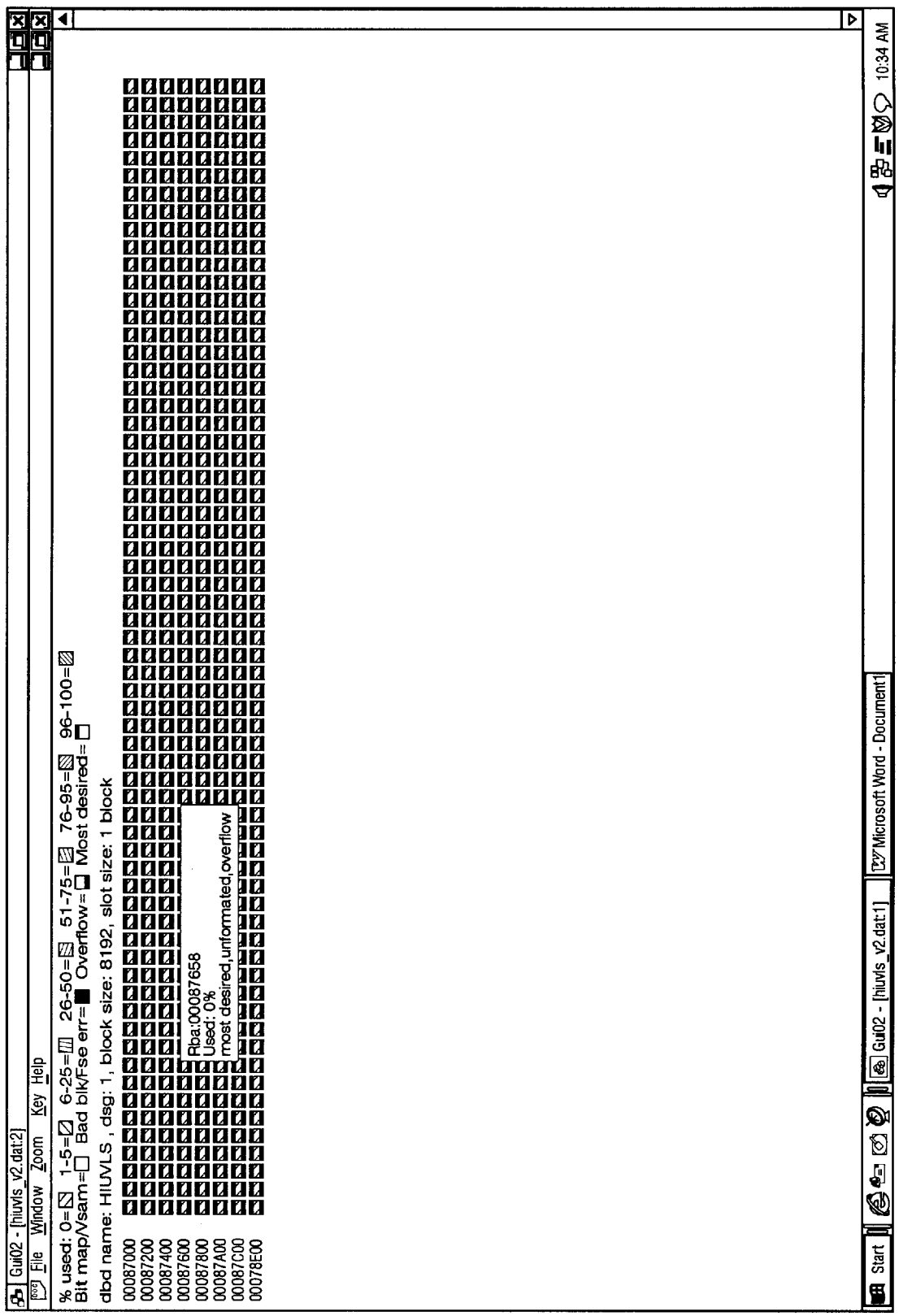
FIG. 11 is a screen shot of an inspection of a view envelope beginning with RBA 00087000 from FIG. 9, and an identification of a view envelope beginning with RBA 00087658 according to one embodiment.

FIG. 11: Inspection and Identification from FIG. 9

FIG. 11 is a screen shot of an embodiment of an inspection of a view envelope beginning with RBA 00087000 from FIG. 9, followed by an identification of byte range 00087658. Inspecting a view envelope is a way to see more detailed information about the space usage associated with the blocks or bytes in a single view envelope. In one embodiment, a left-click of a mouse (or other pointing device) when the mouse is pointing to a single view envelope may indicate an "inspection" user request. Typically, the more detailed information requested is displayed in another window (e.g., a pop-up window).

In FIG. 9, the view ratio is 1 block; since an inspection shows more detail about the space usage associated with the selected view envelope, the view ratio for FIG. 11 is a more detailed increment (i.e., 8 bytes). In one embodiment, if the view ratio is 1 block on the window from which the inspection user request was received (as is the case for FIG. 9), the view ratio on the pop-up window (i.e., FIG. 11) is adjusted to "byte state" (i.e., 8 bytes) and the view envelopes that represent the contents of the block represented by the "inspected" view envelope are displayed. For example, in FIG. 11 the first view envelope shown begins with RBA 00087000 and each view envelope in FIG. 11 describes 8 bytes worth of space.

In one embodiment, a right-click of a mouse when the mouse is pointing to a single view envelope may indicate an "identification" user request. Identifying a view envelope is a way to display identifying information about the view envelope (e.g., RBA, percentage of database space represented by the view envelope that is used, and any of the identifying terms: "Bit map/Vsam", "Bad blk/Fse err", "Overflow", and "Most desired"), if their conditions are present. As shown in FIG. 11, the pop-up identification window includes: "Rba: 00087658; Used: 0%; most desired, unformatted, overflow".

Figure 12:
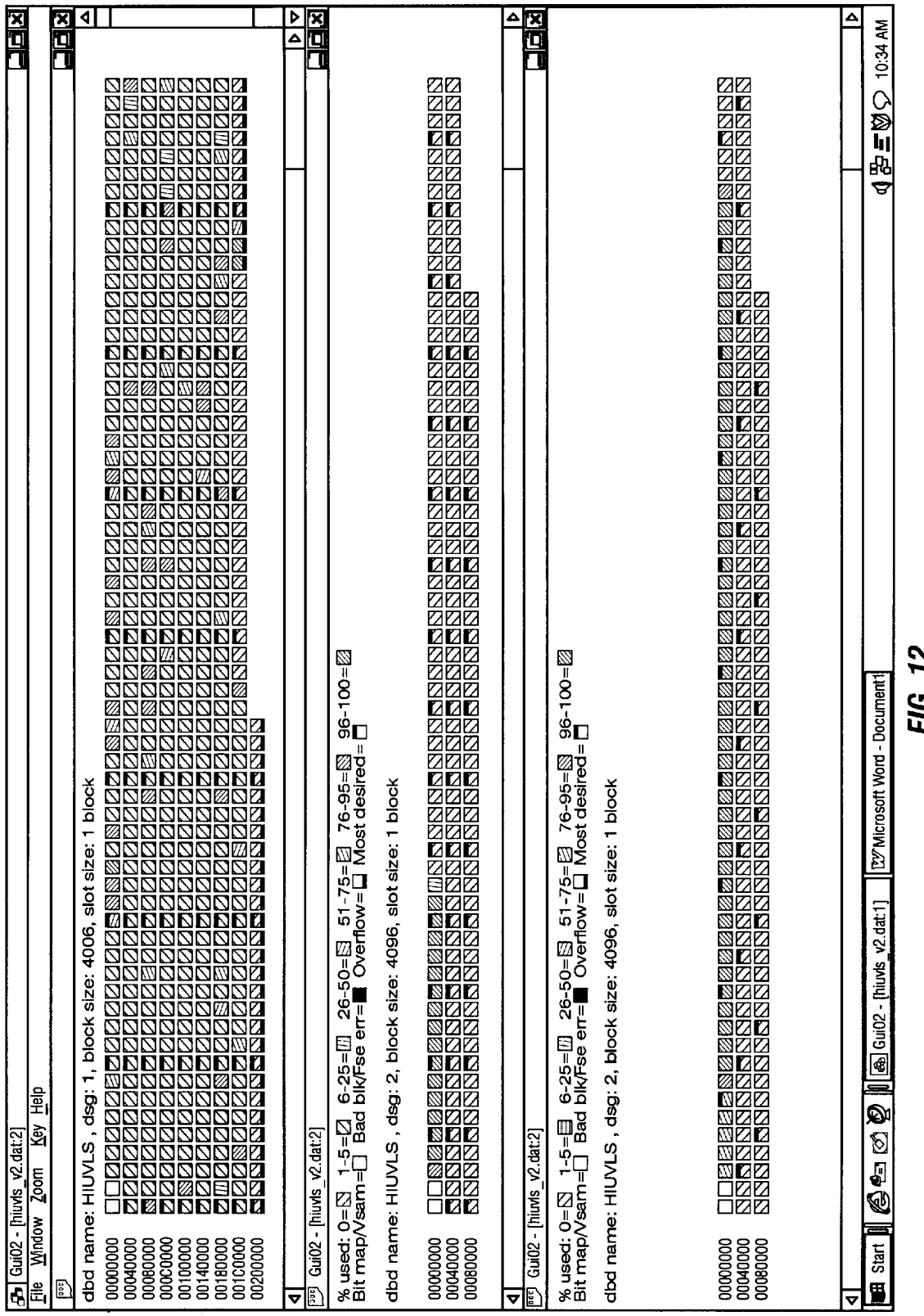
FIG. 12 is a screen shot of an initial view of three data set groups, of IMS database PFRJLM, displaying space usage characteristics of the IMS database according to one embodiment.

FIG. 12: Initial View of Three Data Set Groups, IMS Database PFRJLM

FIG. 12 is a screen shot of an embodiment of an initial view of three data set groups, of IMS database PFRJLM, wherein each data set group shown has a view ratio of 1 block, displaying space usage characteristics of the IMS database. The three initial views shown in FIG. 12 are each similar to the screen shot in FIG. 9. The three data set groups of IMS database PFRJLM appear within one standard screen through the use of the Window menu item, which allows for multiple windows to be tiled within a single screen. Although not shown in FIG. 12, another option under the Window menu item is to cascade the windows (i.e., to overlap the windows so that each window's title remains visible). It is noted that the view envelope areas for FIG. 9 and FIG. 12 are completely different, as the view envelope area represents data from two different databases. Similarly, within FIG. 12, the view envelope areas shown for each data set group represent unique data.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of graphically displaying space usage characteristics of a database, the method comprising:
   receiving a plurality of records from a database;
   processing the plurality of records to generate database information;
   calculating a first view ratio based upon the database information;
   constructing a plurality of view envelopes based on the first view ratio; and
   graphically displaying space usage characteristics for the plurality of view envelopes on a display, wherein the space usage characteristics are determined from the database information.

2. The method of claim 1, wherein the database is an IMS database.

3. The method of claim 2, further comprising:
   building a working storage array from the database information, wherein the working storage may comprises space usage characteristics of blocks in the IMS database; and
   wherein said graphically displaying comprises graphically displaying the space usage characteristics from the working storage may.

4. The method of claim 1, wherein the graphical display of the plurality of view envelopes comprises an indication of an amount of used space within each of the plurality of view envelopes.

5. The method of claim 4, wherein the indication of the amount of used space is described as a percentage.

6. The method of claim 4, wherein the indication of the amount of used space is described as a range of percentages.

7. The method of claim 6, wherein the range of percentages is user configurable.

8. The method of claim 1, further comprising:
   building a working storage array from the database information, wherein the working storage array comprises space usage characteristics of blocks in the IMS database; and
   wherein the plurality of view envelopes are constructed using the working storage array.

9. The method of claim 1, further comprising receiving user input specifying a sub-set of the plurality of view envelopes to be graphically displayed.

10. A method of graphically displaying space usage characteristics of an IMS database, the method comprising:
    receiving a plurality of records from the IMS database wherein the plurality of records comprise ranges of free space within the IMS database;
    processing the plurality of records to generate database information;
    calculating a first view ratio based upon the database information;
    building a working storage array, wherein the working storage array consolidates the plurality of records;
    constructing a plurality of view envelopes based upon data in the working storage array; and
    graphically displaying space usage characteristics on a display, wherein the space usage characteristics are determined from at least a sub-set of the plurality of view envelopes.

11. The method of claim 10, further comprising received user input specifying a sub-set of the plurality of view envelopes to be graphically displayed.

12. The method of claim 11, wherein the user input is a request to change the first view ratio.

13. The method of claim 12, wherein the first view ratio is automatically increased based on user input to zoom out.

14. The method of claim 12, wherein the first view ratio is automatically decreased based on user input to zoom in.

15. The method of claim 11, further comprising:
selecting one of the plurality of view envelopes;
calculating a second view ratio based upon the first view ratio;
constructing a sub-set of the plurality of view envelopes based upon the selected view envelope; and
graphically displaying the sub-set of the plurality of view envelopes in the display wherein more detailed information for the sub-set of the plurality of view envelopes is shown than was previously shown for the plurality of view envelopes.

16. The method of claim 15, wherein a number of view envelopes in the sub-set of the plurality of view envelopes graphically displayed is equal to the first view ratio.

17. The method of claim 15, wherein the first view ratio is measured in blocks and wherein the second view ratio is measured in bytes.

18. The method of claim 11, further comprising:
selecting one of the plurality of view envelopes;
graphically displaying detailed information for the selected view envelope;
wherein the detailed information for the selected view envelope comprises a beginning relative byte address of the selected view envelope and a percentage of used database space represented by the selected view envelope.

19. The method of claim 18, wherein the detailed information for the selected view envelope further comprises identification of a condition of one or more blocks represented by the selected view envelope.

20. The method of claim 19, wherein the condition of one or more blocks represented by the selected view envelope is a special bit map block.

21. The method of claim 17, wherein the condition of one or more blocks represented by the selected view envelope is a special VSAM block.

22. The method of claim 17, wherein the condition of one or more blocks represented by the selected view envelope is a bad block.

23. The method of claim 17, wherein the condition of one or more blocks represented by the selected view envelope is a most desired block.

24. The method of claim 17, wherein the condition of one or more blocks represented by the selected view envelope is a block in error.

25. The method of claim 24, wherein the error condition is a Free Space Element error.

26. The method of claim 24, wherein the error condition is an overflow error.

27. The method of claim 24, further comprising displaying details concerning a reason for the error condition on the display.

28. The method of claim 27, further comprising:
displaying options for correcting the error condition on the display;
receiving user input selecting one or more of the options; and
performing the operations indicated by the selected options to correct the error condition.

29. The method of claim 28, further comprising receiving user input indicating acceptance or rejection of the operations performed to correct the error condition.

30. The method of claim 27, further comprising:
automatically correcting the error condition; and
receiving user input indicating acceptance or rejection of the automatic correction of the error condition.

31. The method of claim 10, wherein the graphical display comprises data relating to one data set group.

32. The method of claim 31, wherein the first view ratio is calculated such that the plurality of view envelopes appears within one screen of the display.

33. The method of claim 10, wherein the first view ratio is measured in blocks.

34. The method of claim 10, wherein the first view ratio is measured in bytes.

35. A system for graphically displaying space usage characteristics of a database, the system comprising:
a network;
a CPU coupled to the network;
a memory coupled to the CPU which stores a database;
a system memory coupled to the CPU, wherein the system memory stores one or more computer programs executable by the CPU;
wherein the computer programs are executable to:
receive a plurality of records from a database;
process the plurality of records to generate database information;
calculate a first view ratio based upon the database information;
construct a plurality of view envelopes based on the first view ratio; and
graphically display space usage characteristics for the plurality of view envelopes on a display, wherein the space usage characteristics are determined from the database information.

36. A system for graphically displaying space usage characteristics of an IMS database, the system comprising:
a network;
a CPU coupled to the network;
a memory coupled to the CPU which stores a database;
a system memory coupled to the CPU, wherein the system memory stores one or more computer programs executable by the CPU;
wherein the computer programs are executable to:
receive a plurality of records from the IMS database wherein the plurality of records comprise ranges of free space within the IMS database;
process the plurality of records to generate database information;
calculate a first view ratio based upon the database information;
build a working storage array, wherein the working storage array consolidates the plurality of records;
construct a plurality of view envelopes based upon data in the working storage array; and
graphically display space usage characteristics on a display, wherein the space usage characteristics are determined from at least a sub-set of the plurality of view envelopes.

37. A carrier medium which stores program instructions for graphically displaying space usage characteristics of a database, wherein the program instructions are executable to implement:

receiving a plurality of records from a database;

processing the plurality of records to generate database information; and calculating a first view ratio based upon the database information;

constructing a plurality of view envelopes based on the first view ratio; and graphically displaying space usage characteristics for the plurality of view envelopes on a display, wherein the space usage characteristics are determined from the database information.

38. A carrier medium which stores program instructions for graphically displaying space usage characteristics of an IMS database, wherein the program instructions are executable to implement:

receiving a plurality of records from the IMS database wherein the plurality of records comprise ranges of free space within the IMS database;

processing the plurality of records to generate database information;

calculating a first view ratio based upon the database information;

building a working storage may, wherein the working storage array consolidates the plurality of records;

constructing a plurality of view envelopes based upon data in the working storage array; and graphically displaying space usage characteristics on a display, wherein the space usage characteristics are determined from at least a sub-set of the plurality of view envelopes.

\* \* \* \* \*